United States Patent [19]

Chapdelaine et al.

[11] Patent Number: 4,959,226
[45] Date of Patent: * Sep. 25, 1990

[54] METHOD OF OPTIMIZING TEXTURE AND PROCESSABILITY OF CHEWING GUMS AND COMPOSITIONS MADE THEREFROM

[75] Inventors: Albert H. Chapdelaine, Naperville; Vasek J. Kures, Willow Springs; Ronald T. Grey, Chicago, all of Ill.

[73] Assignee: Wm. Wrigley Jr. Company, Chicago, Ill.

[*] Notice: The portion of the term of this patent subsequent to Feb. 7, 2006 has been disclaimed.

[21] Appl. No.: 307,013

[22] Filed: Feb. 6, 1989

Related U.S. Application Data

[63] Continuation-in-part of Ser. No. 25,939, Mar. 16, 1987, Pat. No. 4,803,083.

[51] Int. Cl.$^5$ .............................................. A23G 3/30
[52] U.S. Cl. ................................. 426/3; 426/658; 426/804
[58] Field of Search ................................. 426/3-6, 426/658, 804

[56] References Cited

U.S. PATENT DOCUMENTS

| | | | |
|---|---|---|---|
| 3,973,041 | 8/1976 | DuRoss | 426/3 |
| 4,208,431 | 6/1980 | Friello et al. | 426/3 |
| 4,217,368 | 8/1980 | Witzel et al. | 426/3 |
| 4,252,794 | 2/1981 | DuRoss | 426/3 |
| 4,293,570 | 10/1981 | Vadasz | 426/3 |
| 4,388,328 | 6/1983 | Glass | 426/3 |
| 4,448,789 | 5/1984 | Yang | 426/5 |
| 4,507,511 | 3/1985 | Reiff | 426/548 |
| 4,536,396 | 8/1985 | Stephens | 426/548 |
| 4,588,592 | 5/1986 | Elias | 426/5 |
| 4,803,083 | 2/1989 | Chapdelaine et al. | 426/3 |

*Primary Examiner*—Jeanette Hunter
*Attorney, Agent, or Firm*—Willian Brinks Olds Hofer Gilson & Lione

[57] ABSTRACT

A method of optimizing texture and processability of chewing gum compositions is disclosed. The method includes the steps of making a sample batch of chewing gum containing powdered sorbitol, making subsequent batches of gum also using powered sorbitol, using at least two types of powdered sorbitol in one or more of the samples batches and varying the ratio between the at least two types of powdered sorbitol between sample batches in order to optimize texture and processability of the gum. The types of powdered sorbitol may differ in their particle size distribution or particle morphology. Also, the differences in types of powdered sorbitol may be evaluated by making a standard sorbitol property testing (SSPT) gum formula and measuring the Taber and Instron hardness of standard sticks of the resulting gum. Methods of manufacturing gum and gum compositions using optimized ratios of powdered sorbitol are also disclosed.

19 Claims, 1 Drawing Sheet

METHOD OF OPTIMIZING TEXTURE AND PROCESSABILITY OF CHEWING GUMS AND COMPOSITIONS MADE THEREFROM

CROSS REFERENCE TO RELATED PATENT APPLICATION

This application is a continuation-in-part of co-pending application Ser. No. 07/025,939, entitled Method of Optimizing Texture and Processability of Chewing Gums and Compositions Made Therefrom, filed Mar. 16, 1987 now U.S. Pat. No. 4,803,083.

BACKGROUND OF THE INVENTION

The present invention relates to chewing gum compositions and manufacturing methods. In particular, the invention relates to methods of optimizing gum formulations for texture and processability characteristics, and, once optimized, producing gum compositions with the optimized formulation.

One difficulty encountered in reformulating chewing gum compositions to implement various desired ingredient changes, or in developing new formulations, is that the final texture of the new compositions and the processability characteristics associated with their manufacture cannot be determined without actually making sample batches of the gum. This is due to the fact that gum compositions are quite complex systems, containing a gum base (which in itself is usually made from several ingredients), bulking and sweetening agents, plasticizers, fillers, flavors, colors and numerous other ingredients.

Thus, when one ingredient is changed, even one present in small amounts such as the flavor, it is often necessary to make up repeated sample batches of gum using the new ingredient, adjusting the levels of other ingredients in each batch until a gum formulation is reached which has the desired properties. Not only must the final gum texture and other properties be acceptable, but the processability characteristics of the gum should be such that the gum can be made using existing machinery and production techniques.

A major reformulation is very costly and time consuming. To reduce costs, new formulations are generally made up on a small scale while working out an acceptable formulation, and then the formulation is further refined on production scale equipment until its processability is acceptable.

The aforementioned problems are particularly acute in the case of formulating a sugarless gum which is to be processed using the same equipment used to manufacture and wrap a sugar gum.

For example, a sugar chunk gum is usually processed by passing the formulated gum through an extruder which forms a rope. The extrusion requires the gum to be very pliable, which is accomplished by heating the gum before or during the extrusion to 120°-140° F. Before the gum can be cut into chunks and wrapped, it is generally stretched and sized to reduce the extruded rope diameter, and must be cooled. The cooling and sizing is typically done in a cooling tunnel. To save space, the path through the tunnel is circuitous or serpentine in nature. In order to follow this path without breaking, the gum rope must still be flexible when it cools.

To account for variation in production rates between the extruder and the wrapping equipment, conventional chunk gum processing uses a "snaking table" after the cooling tunnel. The snaking table acts as a buffer, filling with gum rope when the wrapping speed is less than the extrusion speed, the excess being depleted when wrapping speeds are increased. It is imperative that the gum rope remain cohesive on the snaking table. Any break in the rope will require manual intervention to splice the rope or refeed it into the cutting and wrapping equipment.

The softness and flexibility required in the cooling tunnel and on the snaking table must be coupled with firmness if the gum is to be successfully cut and wrapped. If the gum is too soft or sticky, it will be smeared by the cutting equipment and be impossible to wrap. It is believed that because their gums do not have proper processability characteristics, some manufacturers of sugarless chunk gum cut the extruded rope into lengths and allow it to cool and set to the proper cutting and wrapping consistency. This procedure requires splicing the lengths before feeding the rope into the cutting equipment, a time consuming and expensive procedure.

Besides the difficulties in formulating sugarless gums for manufacturing processability, the formulations must also have proper softness and non-sticky texture characteristics in its finished state, with proper sweetness and flavor release attributes, to be acceptable to a majority of consumers. Optimizing both this final texture and the processability at the same time has been a time consuming and expensive task.

SUMMARY OF THE INVENTION

Accordingly, a method of optimizing texture and processability of chewing gums containing sorbitol is provided according to the present invention wherein at least two types of powdered sorbitol are used in making sample batches of the gum, and the ratio between the two types of powdered sorbitol is varied between sample batches in order to optimize texture and processability of the gum. The differences between the at least two types of powdered sorbitol may be in their particle size distribution, or their particle morphology, as described more fully herein. The present CIP application further discusses additional, but inherent properties of the powdered sorbitol which can be measured by using standard equipment and procedures to measure the properties of gums made with the powdered sorbitol.

Once the formulation has been optimized, the invention also includes manufacturing the gum by using the at least two types of powdered sorbitol at the optimized ratio. The invention also includes gums manufactured by this process.

By using at least two types of powdered sorbitol in formulating gum composition, it is possible to quickly optimize the formulation while varying only one parameter, the ratio between the types of sorbitol. It has been found that by using just two types of sorbitol, a sugarless gum formulation can be altered (such as by changing the flavor) and the new formulation can be quickly optimized with respect to texture and processability without changing any ingredient levels other than the ratio of the two types of sorbitol powder.

DETAILED DESCRIPTION OF THE FIGURES AND OF THE PREFERRED EMBODIMENTS OF THE INVENTION

The term chewing gum as used herein includes chewing gum, bubble gum and the like.

Chewing gum formulations comprise a matrix of a gum base, usually natural or synthetic blends, in a range of 20-35 percent by weight and typically 25 percent; plasticizers in a range of 5-25 percent and typically 10 percent; glycerine in a range of 0-3 percent and typically 0-5 percent; bulking and/or sweetening agents in a range of 20-90 percent and typically 40 percent; and flavor in the range of 0.5-2 percent and typically 1 percent. High glycerine content gum may include 15-45 percent gum base, 25-60 percent powdered sorbitol and 15-25 percent glycerine.

During development of this invention, applicants have been limited to using commercially available types of powdered sorbitol. As a result, the invention is most easily described in terms which refer to those available sorbitol powders. To facilitate the discussion, the following definitions are provided for terms used throughout the specification and in the claims.

Sorbitol in a solid state may exist in an number of different crystalline forms, most commonly alpha and gamma forms. The alpha form actually includes both alpha and beta crystalline forms in equilibrium, but is commonly referred to in the art simply as alpha sorbitol. Generally used manufacturing processes do not produce either pure forms of alpha or gamma sorbitol. Sorbitol particles of predominantly one crystalline form may include amounts of sorbitol in other crystalline forms, as well as impurities such as mannitol. As used herein, the term "sorbitol" includes sorbitol containing such impurities within commercially acceptable limits.

Figure 1:
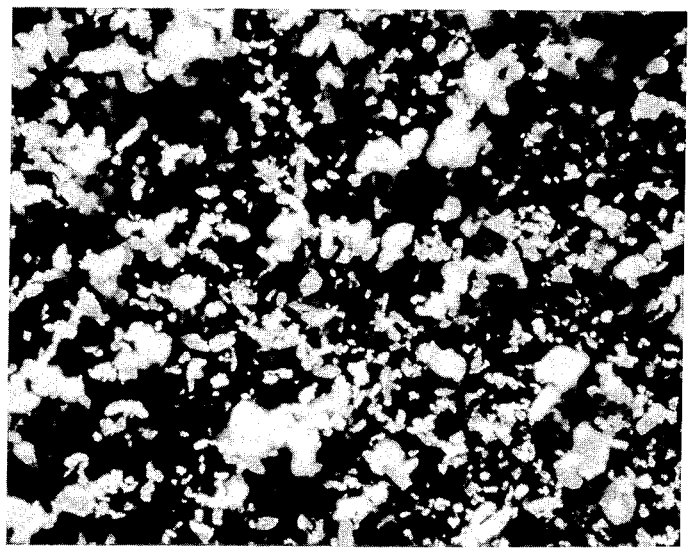
FIG. 1 is a photograph of an enlarged view of powdered sorbitol particles having an ICI morphology.

Different manufacturing processes produce powdered sorbitol having different particle morphologies, most noticeably the particle shapes and densities. Thus gamma sorbitol produced in one manner will have a different morphology than gamma sorbitol produced by a different manner. It is most convenient to refer to these different morphologies by referring to the commercial manufacturer of the powdered sorbitol. As used herein the term "ICI morphology" refers to the flat, sharp-cornered or rod shaped particles characteristic of ICI G-100 gamma sorbitol currently produced by ICI Americas, Inc., Wilmington, Del. ("ICI") (ICI was formerly known as Atlas Chemical Industries, Inc.). FIG. 1 is a reproduction of a photograph of a microscopic enlargement (100X) of ICI G-100 powdered sorbitol particles. ICI G-100 sorbitol is reported to be at least 80% gamma sorbitol. It is believed that the ICI morphology sorbitol is produced by the process described in U.S. Pat. No. 3,973,041 to James W. DuRoss, which is hereby incorporated by reference.

Figure 2:
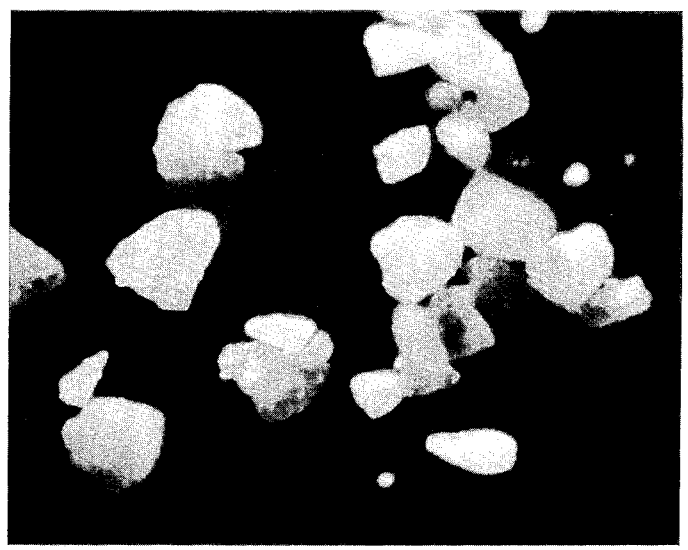
FIG. 2 is a photograph of an enlarged view of powdered sorbitol particles having a Pfizer morphology.

The term "Pfizer morphology" refers to the more rounded, porous particles characteristic of Pfizer A-60 sorbitol currently produced by Pfizer Chemical Co., 235 E. 42nd Street, New York, N.Y. 10017 ("Pfizer"). FIG. 2 is a reproduction of a photograph of a microscopic enlargement (100X) of Pfizer A-60 powdered sorbitol particles. The Pfizer morphology sorbitol is reported to be 60% to 80% gamma sorbitol.

In a further attempt to define what is meant by "ICI morphology" and "Pfizer morphology", two samples of the respective sorbitol powders were viewed by placing them in an oil immersion and viewing them with a microscope. (The microscopic views in FIGS. 1 and 2 are without an oil immersion.) The ICI G-100 particles appeared crystalline in nature, composed of longitudinally arranged, needle shaped crystals, resulting in mostly rod and rectangular shaped particles. The pieces looked fiberous, dense and, when finely divided, needle shaped.

The Pfizer A-60 product appeared as irregular granular shapes with no evident crystal structure. No cleavage planes or smooth surfaces were observed. The exterior of the particles were irregular and roughly spherical, with fine relief suggesting an agglomeration. It appeared that air bubbles and irregular granular bodies were captured within the particles. The lack of continuous crystalline composure was quite different than the observed nature of the G-100 product.

Other sorbitol manufacturers produce powdered sorbitol with different morphologies which have not been microscopically characterized. For example, Roquette Corporation, 1550 Northwestern Avenue, Gurnee, Ill. 60031, sells powdered sorbitol with a particle morphology differing from those of ICI and Pfizer.

Powdered sorbitol is commercially available in different particle size distributions. For example, ICI gamma sorbitol is available in a coarse grind (#834) and also as fines (G-100). As used herein, a particle size distribution corresponding to G-100 means powdered sorbitol which has a particle size distribution within the following ranges, which are the ranges experimentally determined by sieving ICI's G-100 product: (All sieve sizes are U.S. National Standard)

2-5% retained on #60 sieve
1-3% retained on #100 sieve
20-35% retained on #200 sieve
55-75% pass through #200 sieve.

Likewise, a particle size distribution corresponding to A-60 means powdered sorbitol which has a particle size distribution within the following ranges, which are the ranges experimentally determined by sieving Pfizer's A-60 product:

3-15% retained on #60 sieve
35-55% retained on #100 sieve
32-46% retained on #200 sieve
0-25% pass through #200 sieve.

As defined herein, the particle size distribution of two types of powdered sorbitol differ significantly if the difference between the percentages of the particles which will pass through a #100 and a #200 sieve are each greater than 25%. The amounts of ICI G-100 and Pfizer A-60 sorbitol that will pass through a #100 sieve are:

ICI G-100 - at least 92%
Pfizer A-60 - not more than 62%

The difference between these percentages is at least 30% (92%-62%) which is well above 25%.

The amounts of ICI G-100 and Pfizer A-60 sorbitol that will pass through a #200 sieve are:

ICI G-100 —at least 55%; and
Pfizer A-60 —not more than 25%.

The difference between these two percentages is at least 30% (55%-25%), which is well above 25%. Thus, ICI G-100 and Pfizer A-60 differ significantly in their particle size distributions.

The inherent properties of the powdered sorbitol may also be described by the properties of gums in which the sorbitol powder is used, such as Taber and Instron measurements, explained more fully hereafter.

Because the benefits of the invention stem from the use of at least two types of powdered sorbitol, the sorbitol content of the gum must be high enough to be of significance. Such high levels of sorbitol are typically used when the noncariogenic properties of the gum are important, i.e., sugarless gums. Also, the present invention has been found most useful when there are high levels of plasticizer present in the gum. Plasticizers include glycerine, propylene glycol and aqueous syrups such as hydrogenated starch hydrolysate solutions and sorbitol solutions. The invention is particularly useful in anhydrous formulations using high levels of glycerine. In high moisture gums, the sorbitol particles are more likely to dissolve and recrystallize, changing their particle size and morphology over time, and reducing the benefits provided to the gum texture by the invention.

Depending on the other gum ingredients and the types of sorbitol powder in use, the range of ratios between the types of sorbitol powders can vary from 90:10 to 10:90. When using sorbitol powders with different particle size distributions, a range of coarse to fine sorbitol powder ratios of 40:60 to 90:10 has been found most useful. In some high glycerine content gums (over 15%), a coarse:fine sorbitol ratio of 70:30 has been found most useful. ICI G-100 and Pfizer A-60 sorbitol have been found to provide a good combination of powdered sorbitols for use in practicing the various aspects of the invention.

Tests were conducted to provide some guidance as to the importance of the kinds of differences (crystalline form, morphology, and particle size) between the types of sorbitol to be used in making gum formulations. In the tests, four sample batches of gum were produced. The formulations of all gums included:

| | |
|---|---|
| 26.0% | gum base |
| 22.0% | glycerine |
| 4.0% | talc |
| 1.1% | flavor |
| 0.6% | lecithin |
| 1.0% | food acids |
| 0.4% | aspartame |
| 0.2% | color |

The remaining 44.7% of the gum was powdered sorbitol. In each case the gum included 35.7% Pfizer A-60 powdered sorbitol and 9.0% of a different powdered sorbitol as follows:

| Formulation | Powdered Sorbitol |
|---|---|
| A | ICI G-100 |
| B | Roquette "G-100" |
| C | Pfizer "A-100" |
| D | ICI 834 |

The Roquette "G-100" and Pfizer "A-100" are not commercially available. For purposes of the test, Roquette "G-100" was produced by grinding and sieving Roquette gamma sorbitol and collecting the fraction which passed through a #100 sieve. Likewise, Pfizer "A-100" was produced by grinding and sieving Pfizer sorbitol (60–80% gamma) and collecting the fraction which passed through a #100 sieve. ICI 834 is a commercially available gamma sorbitol having an ICI morphology and a particle size distribution (experimentally determined for one sample) as follows:

8% retained on #40 sieve
35.4% retained on #60 sieve
17.9% retained on #80 sieve
11.1% retained on #100 sieve
8.9% retained on #120 sieve
19.3% retained on #200 sieve
5% pass through #200 sieve Thus, each of the four formulations contained two different types of powdered sorbitol, though one of the two types was the same in each sample. The only difference between each sample was that 20% of the powdered sorbitol differed. Compared to the ICI G-100 sorbitol used in Formulation A, the control, the second type of sorbitol powder in the other formulation varied in the following characteristic:

B—morphology
C—crystalline form (partially) and morphology
D—particle size distribution.

Sensory evaluation of the three samples compared to the control, specifically evaluating texture and flavor and sweetness release, produced the following commentary:

A vs. B: B has a firmer initial chew. In the intermediate it becomes softer and slightly slippery. It is more cohesive and squeakier in the final.

The flavor is released more slowly and there is a low impact of flavor and tartness. The flavor character is not as round and not as balanced.

A vs. C: The texture profile of these samples is similar. C is slightly drier initially. In the final the bubbles are very slightly tougher because C is slightly firmer and more cohesive.

The tartness is higher in C and it is not as balanced with flavor as A (control). In the final, there is less residual flavor.

A vs. D: Initially D is firmer and drier. The final is less cohesive but it is firmer and more rubbery. It has poorer bubbles.

The flavor of D is slower releasing and the impact is lower. The flavor, tartness and sweetness are less balanced and present at lower levels throughout.

As a generalization, it was concluded that a difference in particle size distribution was the most significant contributor in the gums' final characteristics, followed by morphology and possibly crystalline form. Because of the complex nature of gum systems, and the wide variety of ingredients used, it is not possible to provide firm rules regarding the types of sorbitol powder and the ratios which will optimize processability and texture characteristics of gum formulation. However, from the above results and familiarity with other formulation work, some general guidelines for practicing the present invention are recognizable. If the sample gum is too lumpy, dry, brittle or firm, the ratio of small particle size to large particle size powdered sorbitol should be increased. If the sample is too soft or its rope is wavy, less fine particles should be used. Also, the use of an ICI morphology sorbitol tends to give a smoother rope, also making the gum soft, whereas Pfizer morphology sorbitol tends to produce a less sticky, dry gum with body, and a rougher rope. The Roquette gamma sorbitol appears to behave more like the Pfizer morphology sorbitol than like the ICI morphology sorbitol.

The sorbitols may also be described by properties of chewing gum in which they are used. Also, by using a standard formula and using different sorbitol powders in making the formula, the inherent property of the sorbitol may be cataloged by virtue of the measured properties of the gum. The following standard sorbitol property testing gum formula (hereinafter referred to as "the SSPT gum formula") is used for purposes of the CIP application:

| | |
|---|---|
| stick gum base | 25.0% |
| sorbitol | 51.2% |
| glycerine | 17.0% |
| mannitol | 6.0% |
| flavor | 0.8% |

The above formula was prepared using two different types of sorbitol powder, ICI 834 and Pfizer A that was sieved to approximately the same particle size distribution as ICI 834. In each formulation, the base was a stick gum base with a softening point of 67° C. and a cone and plate viscosity of 25,500 cps at a speed of 96.0/sec. The SSPT gum formula was prepared by adding 500 grams of gum base to the mixer at time 0, followed by 500 grams of sorbitol. After one minute of mixing, 524 grams of additional sorbitol was added. After an elapsed mixing time of six minutes, 340 grams of 99% glycerine was added, followed by 120 grams of mannitol (ICI Mannitol 100) two minutes later. Finally, after 10 minutes of mixing, 16 grams of "spearmint" flavor was added. Mixing was continued for five minutes, and the formulations were then sheeted and cured for 18 hours under typical commercial condition.

A Teledyne Taber machine, model 150-B, was used to measure the Taber valve of sticks of gum from each formulation. The sticks were ¾" wide and 0.076" thick. Also, an Instron testing machine, model 1122, was used to determine the hardness. The statistical analysis of the measurements are listed below for each formulation.

| | Pfizer A | ICI G |
|---|---|---|
| Taber | | |
| average | 58.4 | 33.3 |
| number tested | 5 | 15 |
| standard deviation | 1.7 | 2.8 |
| Instron hardess | | |
| average | 74.3* | 63.2* |
| number tested | 25 | 24 |
| standard deviation | 1.22 | 1.93 |

As seen from the above, the Taber and Instron hardness values of the two gums were significantly different, even though both were made from the SSPT gum formula and only the type of sorbitol powder used in each gum differed. Thus, the inherent property of the sorbitol measured by measuring the properties of the gum made from the sorbitol as used in the SSPT gum formula is an additional characteristic by which sorbitol powders may be differentiated for purposes of the present invention.

Generally, a confidence interval at or above 95% indicates statistical significance. For purposes of describing the present invention, sorbitols which produce gums having a significant statistical difference in Taber values or in Instron hardness values when made into gums of the SSPT gum formula are considered to be different types of powdered sorbitol.

As a practical matter, it is believed that using such different types of powdered sorbitol in other formulas will produce statistically significant differences in Taber and Instron hardness values. Therefore, formulas other than the SSPT formula will probably be suitable and may be used for convenience to determine whether sorbitol powders are different for purposes of the present invention. Further, one method of optimizing chewing gum formulations pursuant to the present invention is to produce successive batches of the gum using the same formula each time but using two or more different types of sorbitol powder, and vary only the relative ratio of the two or more types of sorbitol powder in each batch such that the Taber value or the Instron hardness value (or both) changes by a statistically significant amount between successive batches. Of course, as the optimum is approached, the Taber and Instron hardness values between successive batches will not vary by statistically significant amounts because the variance in the ratios of sorbitol powders will not need to be varied as much.

Taber values may only be measured for stick gums, but Instron tests may be conducted on both stick and chunk gums.

Because of the range and numbers of variations in gum compositions to which the present invention may be used, representative examples of various aspects of the present invention are provided.

The following two illustrations provide examples of practicing the invention of optimizing processability and texture by varying the ratio of the two different types of powdered sorbitol used in the gum formulations. In Example 1, a series of seven sample batches of strawberry flavored sugarless bubble gum were made. Below each batch formulation is a description of the processability and texture characteristics of the gum made. Note that Formula 1A used only one type of sorbitol powder. It was made several months before the remaining formulas. Also, note that in Formulas 1A, 1B and 1C, three different flavors were used, while Formulas 1D–1G all used the same flavor as Formula 1B. Further, note that 1B and 1E were identical formulations, as were 1D and 1F, but were made on different dates.

| | EXAMPLE 1 | | | | | | |
|---|---|---|---|---|---|---|---|
| FORMULA | 1A | 1B | 1C | 1D | 1E | 1F | 1G |
| ICI-834 Sorbitol | 44.50% | 0 | 0 | 0 | 0 | 0 | 0 |
| ICI-100 Sorbitol | 0 | 9.00 | 9.00 | 8.94 | 9.00 | 8.94 | 11.75 |
| Pfizer A-60 Sorbitol | 0 | 36.18 | 36.48 | 35.94 | 36.18 | 35.94 | 35.93 |
| Hydrogenated Starch Hydrolysate (90% Solids) | 6.16 | 0 | 0 | 0 | 0 | 0 | 0 |
| Base | 24.00 | 26.00 | 26.00 | 26.00 | 26.00 | 26.00 | 24.00 |
| Glycerin | 8.30 | 22.00 | 22.00 | 22.00 | 22.00 | 22.00 | 22.00 |
| Flavor | 0.8* | 0.5** | 0.8*** | 0.5** | 0.5** | 0.5** | 0.5** |
| Sorbitol Solution (70% Solids) | 8.50 | 0 | 0 | 0 | 0 | 0 | 0 |

-continued

EXAMPLE 1

| FORMULA | 1A | 1B | 1C | 1D | 1E | 1F | 1G |
|---|---|---|---|---|---|---|---|
| Talc | 0 | 4.00 | 4.00 | 4.00 | 4.00 | 4.00 | 4.00 |
| Note: Remaining % is fillers, acids, and color. | | | | | | | |
| Gum | Sticky/wet | Poor web Sticky/soft | Poor web | Good stretch No web Moderately sticky | Good stretch No web Moderately sticky | — | — |
| Extrusion | Some stickiness on rollers | Smooth, even rope - rope broke a lot Inconsistent | smooth, even rope | Extrudes well | Breaking rope | Extrudes well breakage | Runs & wraps very well |
| Wrapping | "appears to wrap" | Inconsistent; 1 batch 5 min. longest. Another 55 min. longest run | | Skinny rope Longest run 8 minutes | Longest 10 min. | Skinny rope 18 min. | Longest 27 min. |

*flavor "A"
**flavor "B"
***flavor "C"

Example 2 shows a method of optimization including a series of six sample batches of peppermint flavored sugarless bubble gum that were made. Below each batch formulation is a description of the processability and texture characteristics of the gum made in that sample batch. Note that Formulas 2B and 2C are identical except that 2C was made using part of the gum made from formulation 2B to represent an amount of trim typically used in the commercial manufacture of chewing gum.

The next illustration provides an example of manufacturing gum using the present invention. Example 3 depicts a production size batch of sugarless chunk bubble gum mixed and processed using standard chewing gum equipment such as is well known in the art.

EXAMPLE 3

A mixer is heated to 100°-140° F., preferably about 115° F., and maintained. With the mixer running, 240 lbs. of pelletized Ladco Bubble Base T #32781 is added

EXAMPLE 2

| FORMULA | 2A | 2B | 2C | 2D | 2E | 2F |
|---|---|---|---|---|---|---|
| ICI-G100 Sorbitol | 14.04% | 18.72 | 18.72 | 23.40 | 23.50 | 28.20 |
| Pfizer A-60 Sorbitol | 32.76 | 28.08 | 28.08 | 23.40 | 23.50 | 18.80 |
| Base | 24.00 | 24.00 | 24.00 | 24.00 | 24.00 | 24.00 |
| Glycerin | 22.10 | 22.10 | 22.10 | 22.00 | 22.00 | 22.10 |
| Flavor | 1.00 | 1.00 | 1.00 | 1.00 | 1.00 | 1.00 |
| Calcium Carbonate | 5.00 | 5.00 | 5.00 | 5.00 | 5.00 | 5.00 |
| Note: Remaining % is acids and color. | | | | | | |
| Gum Comments: | Firm Sticky Good stretch | Firm Sticky Good stretch Tough/Dry | Slightly firm Sticky Good stretch | Very dry Very smooth Firm, great stretch & web, Slightly sticky | Very smooth Very good web, Sticky, good stretch Firm | Very sticky Great stretch & Web, Soft, Mixer a bit hot Longer mixing |
| Extruder Comments: | Not sticky, but some pinching | Firm gum breaking in tunnel | Firm, not damp, slightly sticky rough & still pinching. Needs more G-100 | Sticky & damp gum - soft & sticky for wrapping. Inconsistent rope | Not sticking to belts - a little damp but firm High extruder RPM causing irregular rope size | Wavy rope but less breaking due to higher extruder temperature |
| Wrapping Comments: | Rough rope 1 rope breakage - 1 jam in tunnel No buildup on rollers 4 minutes longest run | Wavy rope Breakage Soft gum Rope breaks Weak points Extruder equipment problems | Breakage Stickier buildup 13 minutes longest run | Wavy Sticky, wet, lumpy rope 3 minutes longest run bad run | Wet, sticky, lumpy 10 minute run longest | 16 minute run 11 minute run Sticky, wet gum |

Prior to the discovery of the present invention, one reformulation project required over 50 sample batches of gum to optimize the formulation. By using the optimization process of the present invention, it is believed that a comparable reformulation could be achieved making five sample batches or less.

and masticated for 5 to 15 minutes, preferably about 7 minutes. To this is added 220 lbs of 99% glycerine, 1 lb. of red color dispersion and 8 lbs. of lecithin, which are mixed for 2 to 8 minutes, preferably about 4 minutes. Next, 326 lbs. of Pfizer A-60 sorbitol is added over about 2 minutes, 140 lbs. of ICI G-100 sorbitol is added over about 1½ minutes, and 50 lbs. of calcium carbonate is added over about 15 seconds. The batch is mixed for 5 to 15 minutes, preferably about 10 minutes. Next, 0.8 lb. of NutraSweet and 2.2 lbs of shellac encapsulated NutraSweet are added over about 15 seconds, and mixed for 1 to 3 minutes. The last ingredient is 12 lbs. of flavor, which is mixed 4 to 12 minutes, preferably 5 minutes, after addition.

The batch is unloaded, tempered for 20 minutes to 2 hours at room temperature, extruded and sized to a diameter of about 0.6–0.7 inches, cooled to about 70° F., sized and wrapped.

When using powdered sorbitol, it is advantageous to add the ingredients in an order least likely to result in sorbitol spots. It is believed that if powdered sorbitol is added to the mixer when the gum is stiff, the sorbitol will tend to get packed into corners of the mixer. Later, the powdered sorbitol may break free at a time when it will not get completely mixed, resulting in sorbitol spots. Since the finer sorbitol powder does the least to make the gum hard, it could be added first if spots are encountered. Also, if scrap gum is to be reworked, it should be added after the sorbitol has been mixed in, since the rework gum also tends to make the gum in the mixer stiffer.

Examples 4–8 provide examples of different chewing gum formulations which have been made in accordance with the present invention.

|  | EXAMPLE 4 | EXAMPLE 5 | EXAMPLE 6 |
|---|---|---|---|
| Base | 24.0% | 24.0% | 24.0% |
| Calcium Carbonate | 6.0% | 6.0% | 6.0% |
| Flavor | 2.0% | 2.0% | 2.0% |
| ICI G-100 Sorbitol | 11.16% | 33.49% | 33.49% |
| Pfizer A-60 Sorbitol | 33.49% | 11.24% | 11.16% |
| Glycerine | 17.0% | 17.0% | 17.0% |
| Mannitol | 6.0% | 6.0% | 6.0% |
| Aspartame | 0.3% | 0.22% | 0.3% |
| Color | 0.05% | 0.05% | 0.05% |

The gum of Example 4 was found to be firmer initially (with the high level of coarse Pfizer A-60 sorbitol) compared to Examples 5 and 6. The gum of Example 5 was softer initially.

|  | EXAMPLE 7 | EXAMPLE 8 |
|---|---|---|
| Base | 24.0% | 24.0% |
| Calcium Carbonate | 6.0% | 6.0% |
| Atlas 712 Sorbitol | 44.40% | 22.32% |
| Lecithin | 1.0% | 1.0% |
| Glycerine | 17.0% | 17.0% |
| Mannitol | 6.0% | 6.0% |
| Aspartame | 0.35% | 0.30% |
| Color | 0.05% | 0.06% |
| Flavor | 1.2% | 1.0% |
| ICI G-100 Sorbitol | 0.0% | 22.32% |

The gum of Example 8 was found to chew much better than the gum of Example 7, being less gritty. The gum of Example 8 also mixed less sticky.

Examples 9 and 10 provide illustrations of the preferred embodiments of gum compositions according to the present invention. Example 9 is for a fruit flavor sugarless chunk bubble gum, and Example 10 is for a grape flavor sugarless chunk bubble gum.

|  | EXAMPLE 9 | EXAMPLE 10 |
|---|---|---|
| Pfizer A-60 sorbitol | 32.6% | 35.7% |
| ICI G-100 sorbitol | 14.0% | 9.0% |
| Base | 24.0% | 26.0% |
| Glycerine | 22.0% | 22.0% |
| Calcium Carbonate | 5.0% | 0.0% |
| Talc | 0.0% | 4.0% |
| Flavor | 1.2% | 1.1% |
| Lecithin | 0.8% | 0.6% |
| Color | 0.1% | 0.2% |
| Aspartame | 0.3% | 0.4% |
| Food Acids | 0.0% | 1.0% |

In many instances, it is undesirable to vary the level of components such as gum base, plasticizer, moisture, bulking agents, etc. which traditionally have been varied to account for negative processing characteristics in a gum reformulation project. In the present invention, where two types of sorbitol powder are used, it may be possible to leave all ingredient levels the same and still optimize the texture and processability of the gum by varying only the ratio of the types of sorbitol.

In the preferred optimization process, Pfizer A-60 and ICI G-100 are used. As the level of plasticizer (glycerine for example) decreases, the ratio of Pfizer A-60 to ICI G-100 may be reduced to account for the change. By changing the amount and ratio of the types of sorbitol, the processing characteristics such as mixing, extrusion and sizing properties, and flexibility, stickiness and wrappability may be improved. Also a soft gum that is not sticky, preferable to the majority of consumers, can be produced.

As an additional benefit, sweetness release and perception of a gum formulation can also be modified by using a blend of two types of sorbitol powder in the gum. Smaller particle sizes dissolve more quickly, producing sudden sweetness. By using some larger particle sizes, a slower sweetness release is obtained. Flavor release is also affected by sweetness release, and can be improved by use of the present invention.

The processability characteristics of gum compositions of the present invention should be such that the gum can be wrapped at a rate of 800 pieces per minute or more, and be continuously fed for periods of 10 minutes or longer. By use of the present invention, it is possible to manufacture a high glycerine content, anhydrous, sugarless, chunk gum on conventional sugar, chunk gum equipment. In addition, in such gums the use of the two types of sorbitol can control the softness of the gum without increasing the level of gum base in the gum, which would negatively affect cost and create other problems.

The preferred embodiments of the invention relate to sugarless chunk gum. It is believed that stick gums (which are easier to process) would also benefit by use of the present invention. Stick gums are usually sheeted and scored, then allowed to stand for 24 hours or more before being wrapped. The present invention may be used to improve the gum texture and sweetness characteristics of stick gum, and also to reduce the time (and hence storage space required) between when the gum is scored and when it is wrapped.

The invention has been described with examples using two different types of sorbitol powders. The use of three or more types of sorbitol powders is also contemplated, though it is noted that for the most part, adequate advantages can be achieved using only two types of sorbitol powders.

It should be understood that a wide range of changes and modifications can be made to the preferred embodiments of the invention described above. For example, it is recognized that in the future the characteristics (including particle morphology and particle size distribution) of commercially available sorbitol may change. The definition of "significantly different" particle size distributions, based upon the #100 and #200 sieve sizes, might not always be easily determined. Even though the amounts of sorbitol powder that will pass through these sieve sizes are good reference points, other sieve sizes may need to be considered in determining particle size distributions which provide significant differences in texture and processability characteristics of gum compositions. On the other hand, as specified above, the Taber and Instron hardness values of gums made with new commercially available sorbitol powders will be useful in determining whether the powdered sorbitols differ for purposes of practicing the invention.

It is therefore intended that the foregoing detailed descriptions be regarded as illustrative rather than limiting, and that it be understood that it is the following claims, including all equivalents, which are intended to define the scope of the present invention.

We claim:

1. In a process of developing a new or reformulated chewing gum composition containing gum base, bulking and/or sweetening agents including powdered sorbitol, plasticizers and optional fillers, flavors, colors and processing aids, comprising the steps of
   (1) making a sample batch of a gum composition,
   (2) evaluating the texture and processability of the sample and
   (3) producing and evaluating subsequent sample batches with different amounts of ingredients until acceptable texture and processability characteristics are obtained, the improvement comprising:
   (a) using at least two different sorbitol powders in one or more of the sample batches, wherein the sorbitol powders produce statistically significant differences in at least one of the values selected from the group consisting of Taber and Instron hardness when made into gums of the same formula, and
   (b) varying the ratio between the at least two sorbitol powders in subsequent sample batches to improve the texture and processability characteristics of the gum formulation.

2. The improved process of claim 1 wherein the at least two sorbitol powders produce a statistically significant difference in the Taber value when made into gums of the same formula.

3. The improved process of claim 1 wherein the at least two sorbitol powders produce a statistically significant difference in the Instron hardness value when made into gums of the same formula.

4. The improved process of claim 1 wherein the at least two sorbitol powders comprise only two powdered sorbitols.

5. The improved process of claim 1 wherein the sample batches of gum comprise about 15% or more of a plasticizer chosen from the group consisting of glycerine, propylene glycol, hydrogenated starch hydrolysate syrups, sorbitol solutions and mixtures thereof.

6. In a process of manufacturing chewing gum comprising the steps of (1) providing ingredients for use in the gum composition, including gum base, bulking and/or sweetening agents including powdered sorbitol, plasticizers and optional fillers, flavors, colors and processing aids, and optional fillers, flavors, colors and processing aids, (2) mixing the ingredients, and (3) processing the gum composition into individual servings of gum; the improvement comprising:
   (a) providing the powdered sorbitol in the form of at least two sorbitol powders which produce statistically significant differences in at least one of the values selected from the group consisting of Taber and Instron hardness when made into gums of the same formula.

7. The improved process of claim 6 wherein the at least two sorbitol powders produce a statistically significant difference in the Taber value when made into gums of the same formula.

8. The improves process of claim 6 wherein the at least two sorbitol powders produce a statistically significant difference in the Instron hardness value when made into gums of the same formula.

9. The improved process of claim 6 wherein the at least two sorbitol powders comprise only two sorbitol powders.

10. The improved process of claim 6 wherein the gum comprises about 15% or more of a plasticizer chosen from the group consisting of glycerine, propylene glycol, hydrogenated starch hydrolysate syrups, sorbitol solutions and mixtures thereof.

11. The improved process of claim 6 wherein the gum is a sugarless gum.

12. The improved process of claim 9 wherein the ratio of the two sorbitol powders is between about 90:10 and 10:90.

13. The improved process of claim 6 wherein the gum comprises bubble gum.

14. A chewing gum composition comprising gum base, plasticizer and optional fillers, flavors, colors and processing aids, and bulking and/or sweetening agents including, when first manufactured, a first and a second sorbitol powder wherein the properties of the two sorbitol powders are such that when used to make gums of the same formulation, either the Taber or Instron hardness values of the two gums differ by a statistically significant amount.

15. A chewing gum composition of claim 14 comprising:
   14–45% gum base,
   25–60% powdered sorbitol,
   15–25% glycerine,
      wherein the powdered sorbitol comprises a ratio of 90:10 to 10:90 of said first sorbitol powder to said second sorbitol powder.

16. The composition of claim 14 wherein the chewing gum composition comprises a bubble gum composition comprising about:
   24% bubble gum base,
   32.6% first sorbitol powder,
   14% second sorbitol powder,
   22% glycerine, and flavor and optional ingredients such as fillers, softeners, color, food acids and high intensity sweeteners.

17. The composition of claim 14 wherein the chewing gum composition comprises a grape flavored bubble gum composition comprising about:
   26% bubble gum base,
   35.7% first sorbitol powder,
   9% second sorbitol powder,
   22% glycerine, and flavor and optional ingredients such as fillers, softeners, color, food acids and high intensity sweeteners.

18. The chewing gum composition made according to the improved process of claim 6.

19. In a process of developing a new or reformulated chewing gum composition containing gum base, bulking and/or sweetening agents including powdered sorbitol, plasticizers and optional fillers, flavors, colors and processing aids, comprising the steps of (1) making a sample batch of a gum composition, (2) evaluating the texture and processability of the sample and (3) producing and evaluating subsequent sample batches with different amounts of ingredients until acceptable texture and processability characteristics are obtained, the improvement comprising:

(a) using at least two different sorbitol powders in one or more of the sample batches, and (b) varying the ratio between the at least two sorbitol powders in a subsequent sample batch such that either the Taber value or Instron hardness value differ by a statistically significant amount between the two batches.

* * * * *

UNITED STATES PATENT AND TRADEMARK OFFICE
CERTIFICATE OF CORRECTION

PATENT NO. : 4,959,226

DATED : September 25, 1990

INVENTOR(S) : Albert H. Chapdelaine et al.

It is certified that error appears in the above-identified patent and that said Letters Patent is hereby corrected as shown below:

ON THE TITLE PAGE:

IN THE REFERENCES CITED

On the cover page, on the line following "4,803,083  2/1989  Chapdelaine et al. ...............426/3", please insert:

| | | | |
|---|---|---|---|
| --2,315,699 | 4/1943 | Geopp, Jr. ................ | 568/852 |
| 2,483,254 | 9/1949 | Almy ..................... | 568/852 |
| 2,594,863 | 4/1952 | Buck et al. .............. | 568/852 |
| 3,308,171 | 3/1967 | Oikawa ................... | 568/852 |
| 3,330,874 | 7/1967 | Shannon .................. | 568/852 |
| 4,316,915 | 2/1982 | Friello et al. ............ | 426/5 |
| 4,545,392 | 10/1985 | Sensabaugh, Jr. et al. .... | 131/352 |
| 4,605,794 | 8/1986 | Reiff et al. ............. | 568/852 |
| 4,744,991 | 5/1988 | Serpelloni ............... | 426/5 |
| 4,753,805 | 6/1988 | Cherukuri et al. ......... | 426/5 |

FOREIGN PATENT DOCUMENTS

| | | |
|---|---|---|
| 0 151 344 | 8/1985 | EPO |
| 0 192 007 | 8/1986 | EPO |

OTHER PUBLICATIONS

DuRoss, James, _Modified Crystalline Sorbitol_, November 1982.--

UNITED STATES PATENT AND TRADEMARK OFFICE
CERTIFICATE OF CORRECTION

PATENT NO. : 4,959,226
DATED : September 25, 1990
INVENTOR(S) : Albert H. Chapdelaine et al.

It is certified that error appears in the above-identified patent and that said Letters Patent is hereby corrected as shown below:

IN THE ABSTRACT

On the cover page, line 7 of the Abstract, please delete "samples" and substitute therefor --sample--.

In column 1, line 12, after "1987" please insert --,--.

In column 2, line 5, please delete "remain" and substitute therefor "remains".

In column 3, line 25, before "number" please delete "an" and substitute therefor --a--.

In column 3, line 66, before "two" please delete "morphology"," and substitute therefor --morphology,"--.

In column 4, line 6, please delete "fiberous" and substitute therefor --fibrous--.

UNITED STATES PATENT AND TRADEMARK OFFICE
CERTIFICATE OF CORRECTION

PATENT NO. : 4,959,226

DATED : September 25, 1990

INVENTOR(S) : Albert H. Chapdelaine et al.

Page 3 of 5

It is certified that error appears in the above-identified patent and that said Letters Patent is hereby corrected as shown below:

In column 6, line 6, after "sieve" please insert --.--.

In column 6, line 22, please delete "A vs. B:" and substitute therefor --A vs. B:--.

In column 6, lines 22 and 23, after "intermediate" please insert --,--.

In column 6, line 28, please delete "A vs. C:" and substitute therefor --A vs. C:--.

In column 6, line 29, after "final" please insert --,--.

In column 6, line 35, please delete "A vs. D:" and substitute therefor --A vs. D:--.

In columns 9 and 10, line 8 of Example 1, under the heading "1C", please delete "smooth," and substitute therefor --Smooth,--.

In columns 9 and 10, line 6 of Example 2, under the heading "FORMULA" please delete "Glycerin" and substitute therefor --Glycerine--.

In columns 9 and 10, line 21 of Example 2, under the heading "2E", after "firm" please insert --.--.

UNITED STATES PATENT AND TRADEMARK OFFICE
CERTIFICATE OF CORRECTION

PATENT NO. : 4,959,226

DATED : September 25, 1990

INVENTOR(S) : Albert H. Chapdelaine et al.

It is certified that error appears in the above-identified patent and that said Letters Patent is hereby corrected as shown below:

In column 10, line 64, after "220" please delete "lbs" and substitute therefor --lbs.--.

In column 11, line 68, please delete "sorbitol" and substitute therefor --Sorbitol--.

In column 12, line 4, please delete "sorbitol" and substitute therefor --Sorbitol--.

In column 12, line 15, after "etc." please insert --,--.

In column 12, line 25, after "glycerine" please insert --,--.

Col. 13, In claim 1, line 33, after "sample" please insert --,--.

Col. 14, In claim 8, line 1, please delete "improves" and substitute therefor --improved--.

Col. 14, In claim 16, please end line 57, after "and" and begin line 8 with a subparagraph --flavor and optional ingredients--.

Col. 14, In claim 17, please end line 66, after "and" and begin line 8 with a subparagraph --flavor and optional ingredients--.

UNITED STATES PATENT AND TRADEMARK OFFICE
CERTIFICATE OF CORRECTION

PATENT NO. : 4,959,226

DATED : September 25, 1990

INVENTOR(S) : Albert H. Chapdelaine et al.

It is certified that error appears in the above-identified patent and that said Letters Patent is hereby corrected as shown below:

Col. 1, In claim 19, line 9, after "sample" please insert --,--.

Signed and Sealed this

Twenty-fourth Day of November, 1992

Attest:

DOUGLAS B. COMER

Attesting Officer

Acting Commissioner of Patents and Trademarks